US011952815B2

(12) United States Patent
Nishinaka (10) Patent No.: US 11,952,815 B2
(45) Date of Patent: Apr. 9, 2024

(54) DOOR OPEN AND CLOSE MECHANISM OF MACHINE TOOL

(71) Applicant: OKUMA CORPORATION, Niwa-Gun (JP)

(72) Inventor: Tetsunobu Nishinaka, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 17/664,229

(22) Filed: May 20, 2022

(65) Prior Publication Data

US 2022/0381076 A1 Dec. 1, 2022

(30) Foreign Application Priority Data

May 26, 2021 (JP) ................. 2021-088664

(51) Int. Cl.
*B60J 5/06* (2006.01)
*B23Q 1/01* (2006.01)
(Continued)

(52) U.S. Cl.
CPC ............... *E05D 15/08* (2013.01); *B23Q 1/01* (2013.01); *E05D 15/0621* (2013.01); *E05Y 2201/684* (2013.01); *E05Y 2201/716* (2013.01); *E05Y 2201/722* (2013.01); *E05Y 2800/71* (2013.01); *E05Y 2900/608* (2013.01)

(58) Field of Classification Search
CPC ....... E05D 15/08; E05D 15/0621; B23Q 1/01; B23Q 11/0891; E05Y 2201/684; E05Y 2201/716; E05Y 2201/722; E05Y 2800/71; E05Y 2900/608

USPC .... 49/125, 127, 136, 33, 362; 160/220, 221, 160/222, 223, 224, 225, 226, 227
See application file for complete search history.

(56) References Cited

U.S. PATENT DOCUMENTS 1,093,731 A * 4/1914 Scullis et al. ................. 187/315
1,776,163 A * 9/1930 Mayer ................... E05F 17/002
49/362
(Continued)

FOREIGN PATENT DOCUMENTS

CN 108756713 A * 11/2018 ............. E05D 13/00
CN 113266254 A * 8/2021
(Continued)

*Primary Examiner* — Jerry E Redman
(74) *Attorney, Agent, or Firm* — BURR PATENT LAW, PLLC (57) ABSTRACT

A door open and close mechanism for opening and closing a plurality of doors in a machine tool including a cover. The door open and close mechanism includes a linkage mechanism and a slide mechanism. The linkage mechanism is disposed between an operation door and an intermediate door. The linkage mechanism associates the intermediate door with the opening and closing of the operation door. The slide mechanism is disposed between the operation door and the linkage mechanism. The slide mechanism enables the operation door alone to open and close by a predetermined moving distance. When the operation door is operated to open and close within the moving distance, the operation door alone opens and closes by the slide mechanism. When the operation door is operated to open and close beyond the moving distance, the intermediate door opens and closes in association through the linkage mechanism.

1 Claim, 6 Drawing Sheets

(51) Int. Cl.
*E05D 15/06* (2006.01)
*E05D 15/08* (2006.01)

(56) References Cited

U.S. PATENT DOCUMENTS

| | | | | |
|---|---|---|---|---|
| 3,452,477 | A | * | 7/1969 | Sassano .................... E06B 9/04 49/362 |
| 4,616,451 | A | * | 10/1986 | Glick ...................... E04B 7/166 52/72 |
| 4,893,435 | A | * | 1/1990 | Shalit .................... E05F 15/643 49/449 |
| 5,570,979 | A | * | 11/1996 | Okamoto ................. F16P 3/02 160/202 |
| 5,893,242 | A | * | 4/1999 | Perron .................... E05F 11/53 49/362 |
| 6,039,516 | A | * | 3/2000 | Diels ................. B23Q 11/0825 160/202 |
| 6,658,793 | B2 | * | 12/2003 | Perron ..................... E06B 9/04 49/63 |
| 8,973,643 | B2 | * | 3/2015 | Molteni ................ E05F 15/635 160/197 |
| 2001/0037601 | A1 | * | 11/2001 | Zappa .................... B66B 13/06 49/41 |

FOREIGN PATENT DOCUMENTS

| | | | | | |
|---|---|---|---|---|---|
| CN | 114412337 | A | * | 4/2022 | |
| DE | 102022205259 | A1 | * | 12/2022 | ............... B23Q 1/01 |
| JP | 03087487 | A | * | 4/1991 | |
| JP | H07-040050 | U | | 7/1995 | |
| JP | H09-262741 | A | | 10/1997 | |
| JP | 2013-099803 | A | | 5/2013 | |
| JP | 2014-223688 | A | | 12/2014 | |
| JP | 2016120911 | A | * | 7/2016 | |
| KR | 20220138944 | A | * | 10/2022 | |

* cited by examiner

DOOR OPEN AND CLOSE MECHANISM OF MACHINE TOOL

BACKGROUND

This application claims the benefit of Japanese Patent Application Numbers 2021-088664 filed on May 26, 2021, the entirety of which is incorporated by reference.

1. Technical Field

The disclosure relates to a door open and close mechanism that opens and closes an opening portion disposed to a cover of a machine tool.

2. Related Art

A machine tool includes a cover provided with an opening portion for performing setup work, cleaning, and the like. The opening portion is provided with a door that can open and close manually or automatically. As the door open and close mechanism, for example, JP-UM 1995-40050 A and JP 2013-99803 A disclose an invention in which upper ends of two door bodies are connected to a chain placed in a tension state between sprockets. Thus, the two door bodies are allowed to open and close in which one door body is linked to a slide of the other door body.

Furthermore, JP 2014-223688 A discloses a structure in which an upper portion of one door is provided with a support plate supporting a roller rolling over an upper surface of a rail, and an upper portion of another door is provided with a driving plate in contact with the upper portion of the roller. Thus, the other door is linked to a slide of the one door. JP 1997-262741 A discloses a structure in which a first rack is fixed to an upper side of an opening portion, a pinion meshing with the first rack and a second rack is disposed to an upper portion of one door, and the second rack meshing with the pinion is fixed to an upper portion of another door. Thus, the other door is linked to a movement of the one door and is moved in a same direction.

In the linkage mechanisms disclosed in JP-UM 1995-40050 A, JP 2013-99803 A, JP 2014-223688 A, and JP 1997-262741 A described above, since a plurality of doors open and close simultaneously, the time needed for the opening and closing can be shortened. However, since a sliding resistance increases as the number of doors increases, an operator's workability degrades by allowing a manual open/close. Alternatively, although automatically opening and closing mechanism using a cylinder or other devices improves workability, costs would increase because, for example, equipment for automatic opening and closing would need to be installed.

On the other hand, machine tools are sometimes operated by an operator opening a first door (operation door) alone. However, the linkage mechanism cannot deal with the above case and causes useless operations of the doors.

Therefore, it is an object of the disclosure to provide a door open and close mechanism of a machine tool that enjoys advantages of a linkage mechanism and can deal with work that opens an operation door alone, thus allowing excellent workability.

SUMMARY

In order to achieve the above-described object, there is provided a door open and close mechanism for opening and closing a plurality of doors in a machine tool including a cover to open and close an opening portion using the plurality of doors. The plurality of doors include an operation door operated to open and close and at least one intermediate door. The door open and close mechanism includes a linkage mechanism and a slide mechanism. The linkage mechanism is disposed between the operation door and the intermediate door. The linkage mechanism associates the intermediate door with the opening and closing of the operation door. The slide mechanism is disposed between the operation door and the linkage mechanism. The slide mechanism enables the operation door alone to open and close by a predetermined moving distance. When the operation door is operated to open and close within the moving distance, the operation door alone opens and closes by the slide mechanism. When the operation door is operated to open and close beyond the moving distance, the intermediate door opens and closes in association through the linkage mechanism.

In another aspect of the disclosure, which includes the above configuration, the linkage mechanism uses a rack and pinion mechanism.

In another aspect of the disclosure, which includes the above configuration, the rack and pinion mechanism includes a moving side rack disposed on a side of the operation door, and a fixed side rack disposed on a side of the cover. The rack and pinion mechanism also includes a first pinion disposed on a side of the intermediate door and meshing with the moving side rack, and a second pinion disposed on the side of the intermediate door, coaxially with the first pinion and meshing with the fixed side rack. The slide mechanism is disposed between the operation door and the moving side rack.

With the disclosure, since only a force against the sliding resistance of the slide mechanism is sufficient when partially opening the opening portion alone by operating the operation door, the operator bears no burden. On the other hand, since the intermediate door is associated with the linkage mechanism after the slide mechanism operates when fully opening the opening portion, even a plurality of doors can be operated simultaneously. Accordingly, it becomes possible to open the operation door alone while enjoying the advantages of the linkage mechanism, thus allowing an excellent workability.

In another aspect of the disclosure, in addition to the above-described effects, since the linkage mechanism uses the rack and pinion mechanism, the linkage mechanism can be formed with a small space. Furthermore, the operation door and the intermediate door can slide smoothly.

In another aspect of the disclosure, in addition to the above-described effects, the rack and pinion mechanism is structured including the moving side rack disposed on the operation door side, and the fixed side rack disposed on the cover side. Further, the rack and pinion mechanism is structured including the first pinion disposed on the intermediate door side and meshing with the moving side rack, and the second pinion disposed on the intermediate door side, coaxially with the first pinion, and meshing with the fixed side rack. The slide mechanism is disposed between the operation door and the moving side rack. Thus, by changing a reduction gear ratio between the two pinions, movement amounts of the operation door and the intermediate door can be changed easily. Furthermore, by adjusting the slide mechanism, the moving distance of the operation door can be set easily.

DETAILED DESCRIPTION

The following describes an embodiment of the disclosure based on the drawings.

Figure 1:
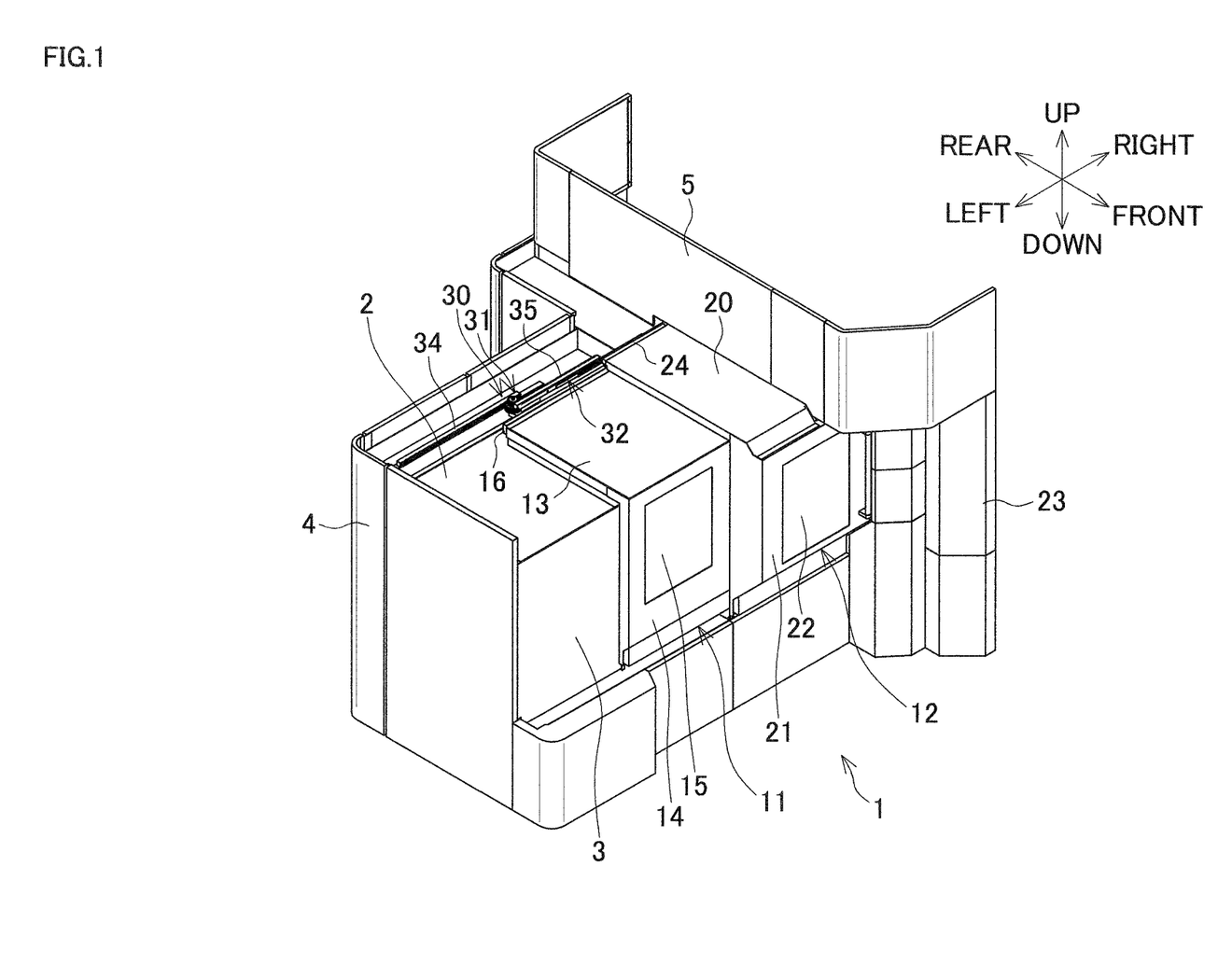
FIG. 1 is a perspective view illustrating a part of a cover of a machine tool.

FIG. 1 is a perspective view illustrating a part of a cover of a machine tool. A cover 1 includes a top plate 2 and a front plate 3, and has a box shape covering a processing region of the machine tool (not illustrated) from above. An outer cover 4 is disposed behind and on a side portion of the cover 1. A partition cover 5 is disposed on a right side of the cover 1 for partitioning off the machine tool.

An opening portion 10 (FIG. 4A to FIG. 4C) is formed on a front side of the cover 1 across the top plate 2 and the front plate 3. The opening portion 10 includes an intermediate door 11 positioned in its inside, and an operation door 12 positioned outside of the intermediate door 11 disposed slidably in the right-left direction.

First, the intermediate door 11 has an inverse L shape in a side view, including an inside upper plate portion 13 disposed in parallel to the top plate 2 on the top plate 2 and an inside front plate portion 14 formed downwardly from a front end of the inside upper plate portion 13 and is in parallel to the front plate 3. An inside window 15 is formed on the inside front plate portion 14.

Figure 2:
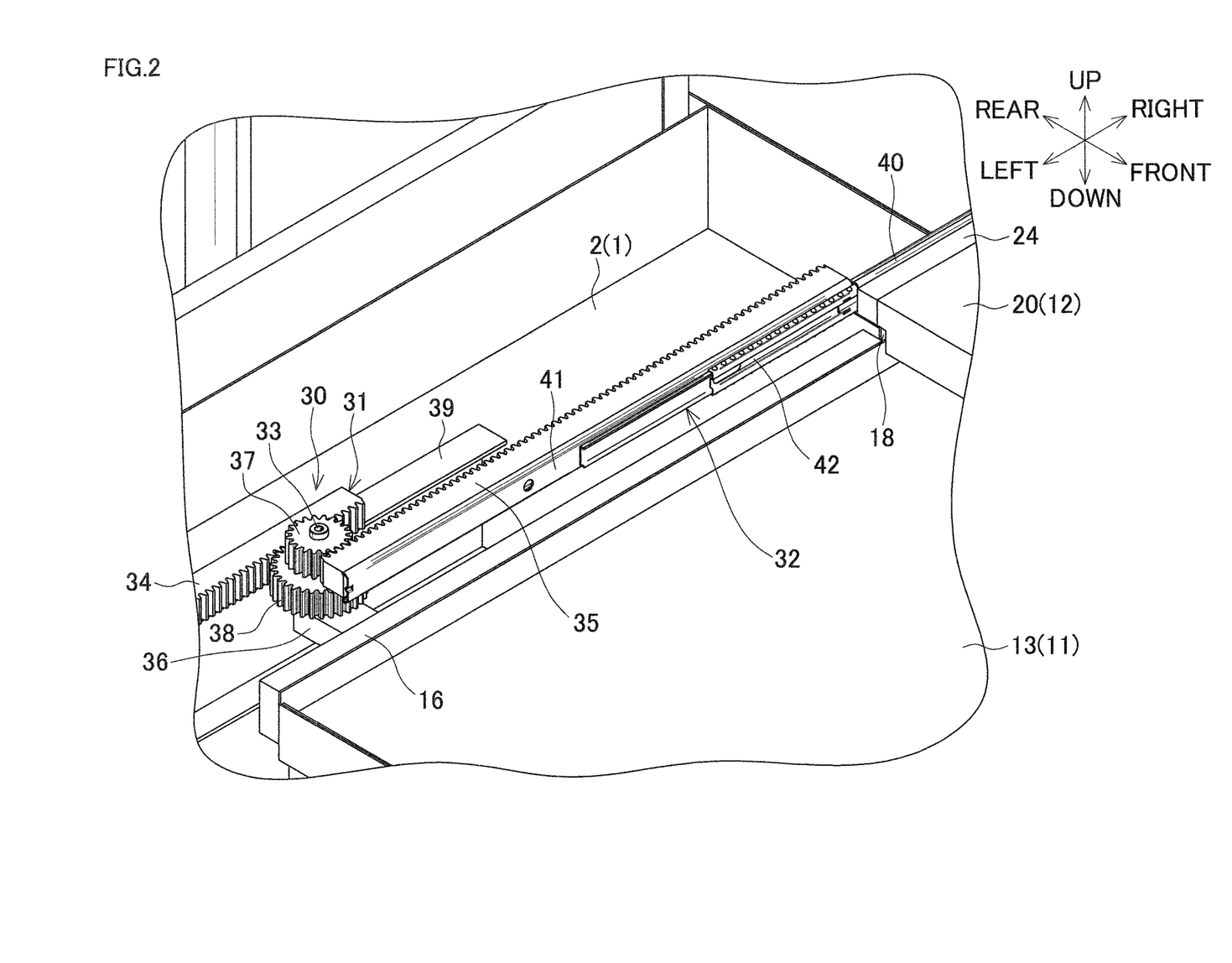
FIG. 2 is an enlarged view of a door open and close mechanism portion of FIG. 1.
Figure 3:
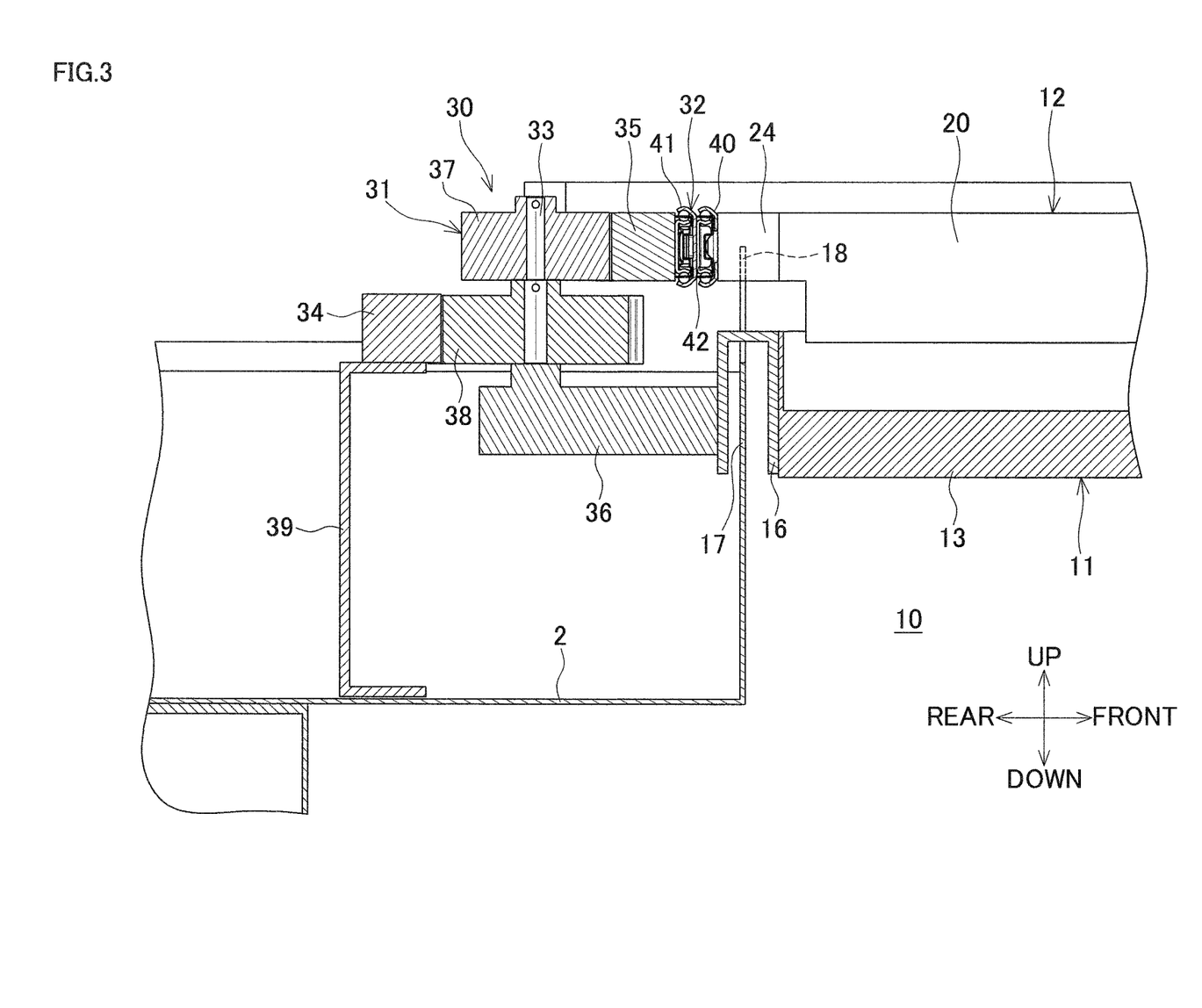
FIG. 3 is a vertical cross-sectional view of a pinion shaft portion.

As illustrated in FIG. 2 and FIG. 3, an inside rail 16 having an inverse U shape on a lateral cross-sectional surface is mounted in the right-left direction on a rear end surface of the inside upper plate portion 13. A left guide plate 17 and a right guide plate 18 standing upright are successively formed in the right-left direction on a rear end of the opening portion 10 of the top plate 2. The right guide plate 18 is formed with its upper end higher than the left guide plate 17. The inside rail 16 is engaged with the left guide plate 17 from above.

The operation door 12 has an inverse L shape in a side view, including an outside upper plate portion 20 disposed in parallel to the top plate 2 on an upper side of the inside upper plate portion 13 of the intermediate door 11, and an outside front plate portion 21 formed downward from a front end of the outside upper plate portion 20 and is disposed in parallel to the front plate 3 on a front side of the inside front plate portion 14 of the intermediate door 11. An outside window 22 is formed on the outside front plate portion 21. A handle 23 is disposed in an upper and lower direction on the right side of the outside window 22. An outside rail 24 having an inverse U-shape on a lateral cross-sectional surface is mounted in the right-left direction on a rear end surface of the outside upper plate portion 20. The outside rail 24 is engaged with the right guide plate 18 from above.

Figure 4A:
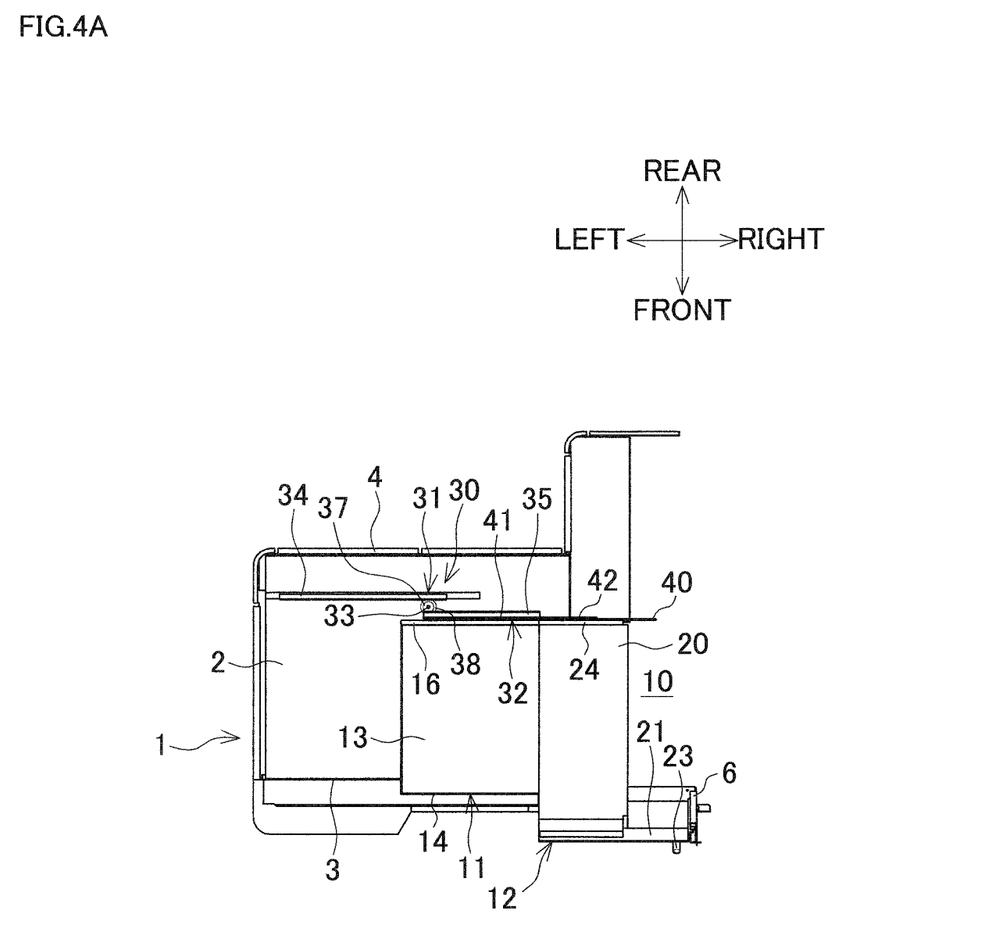
FIG. 4A is an explanatory plan view illustrating the operation door and the intermediate door in a closing position of the opening portion.

As illustrated in FIG. 4A, the operation door 12 is restricted from sliding to the right side at a position where the outside front plate portion 21 is in contact with a vertical frame 6 of the cover 1 dividing the right edge of the opening portion 10. In the outside upper plate portion 20 of the operation door 12, a lateral width is formed smaller than the outside front plate portion 21 and the inside upper plate portion 13 of the intermediate door 11, and at a position where the outside front plate portion 21 is in contact with the vertical frame 6, the outside upper plate portion 20 comes into contact with the partition cover 5 and closes the upper side of the opening portion 10. The outside front plate portion 21 has a lateral width slightly bigger than the inside front plate portion 14 of the intermediate door 11.

In a rear of the intermediate door 11 and the operation door 12, a door open and close mechanism 30 for opening and closing both the doors 11, 12 is disposed. As illustrated in FIGS. 2 and 3, the door open and close mechanism 30 includes a linkage mechanism 31 that associates the intermediate door 11 with the open and close movement of the operation door 12, and a slide rail 32 that enables the operation door 12 alone to open and close.

The linkage mechanism 31 is a rack and pinion mechanism including a pinion shaft 33, a fixed side rack 34, and a moving side rack 35.

The pinion shaft 33 is disposed on the inside rail 16 of the intermediate door 11. A bracket 36 projecting rearward is fixed to a rear surface left end portion of the inside rail 16, and the pinion shaft 33 is rotatably supported upward to the rear end of the bracket 36. An upper pinion 37 with a small diameter is coaxially fixed on the upper side of the pinion shaft 33, and a lower pinion 38 with a diameter larger than the upper pinion 37 is coaxially fixed on the lower side of the pinion shaft 33.

The fixed side rack 34 is fixed on the top plate 2 in the rear of the pinion shaft 33. A support plate 39 is fixed in a right-left direction on the top plate 2, and the fixed side rack 34 is mounted in a right-left direction with its tooth surface facing the front side on the upper surface of the support plate 39. The tooth surface of the fixed side rack 34 meshes with the lower pinion 38.

The moving side rack 35 is fixed to the outside rail 24 of the operation door 12 via the slide rail 32. The slide rail 32 includes a front rail 40, a rear rail 41, and an intermediate rail 42 between the front rail 40 and the rear rail 41, and mutually relatively movably binds each of the rails 40 to 42 in a longitudinal direction. Here, the front rail 40 is mounted in parallel to a rear surface of the outside rail 24 of the operation door 12. The rear rail 41 is mounted in parallel to a front face of the moving side rack 35 facing its tooth surface to a rear side. The tooth surface of the moving side rack 35 meshes with the upper pinion 37.

In the slide rail 32, the front rail 40, the rear rail 41, and the intermediate rail 42 overlap in a front view, and are mutually engaged by a stopper (not illustrated) in a contracted state where the slide rail 32 becomes the shortest in a right-left direction. When a force that exceeds the engaging force is applied in the right-left direction, the stopper comes off and the rails 40 to 42 become mutually relatively movable in the right-left direction.

As illustrated in FIG. 1 and FIG. 4A, in the door open and close mechanism 30 configured as above, at the closing positions of the intermediate door 11 and the operation door 12 that closes the opening portion 10, the intermediate door 11 is positioned on the left side of the opening portion 10, and the operation door 12 is positioned on the right side of the opening portion 10, and the mutually adjacent end portions are in an overlapping state. At this point, the pinion shaft 33 is positioned biased to the right edge of the fixed side rack 34, allowing the lower pinion 38 to mesh with the fixed side rack 34. The moving side rack 35 is projected to the right side of the fixed side rack 34 and meshes with the upper pinion 37 on the left end of the moving side rack 35. The slide rail 32 is in a stretched state where the intermediate rail 42 is projected to the right side of the rear rail 41, and the front rail 40 is projected to the right side of the intermediate rail 42.

Figure 4B:
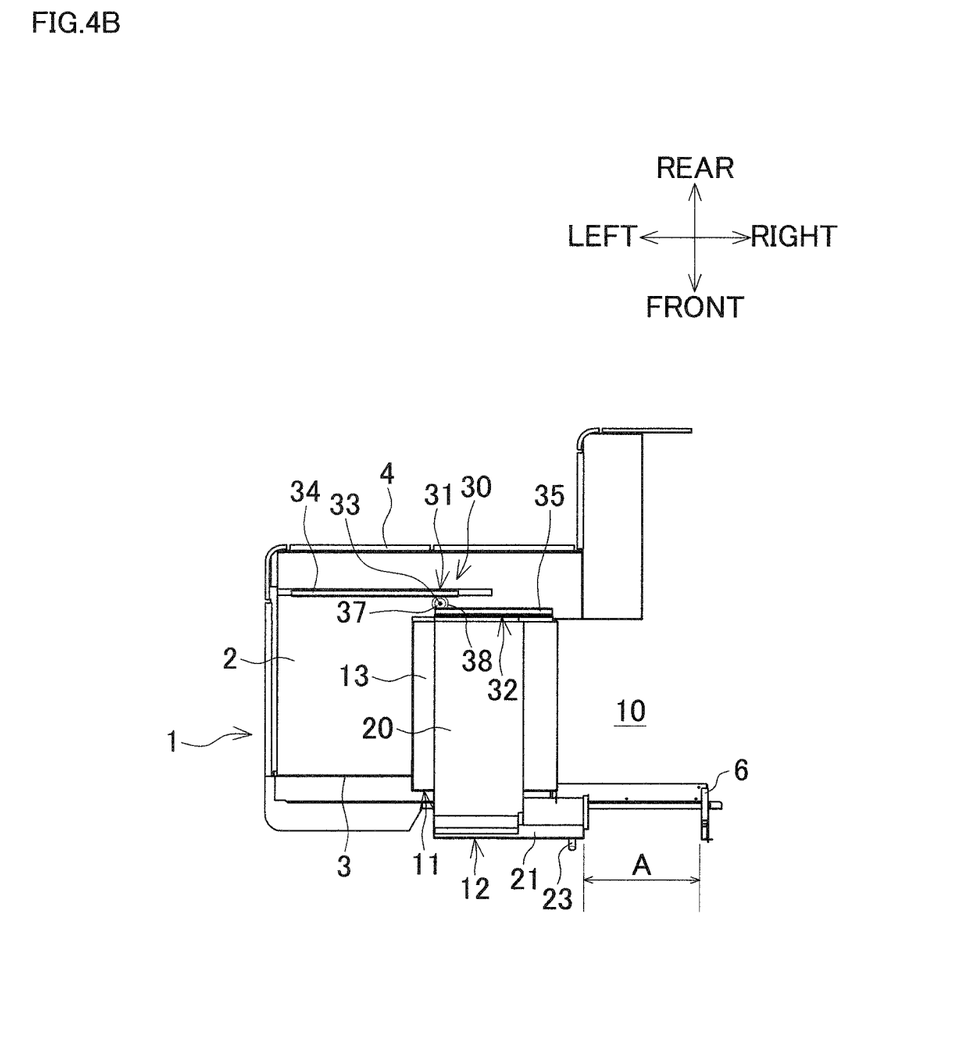
FIG. 4B is an explanatory plan view illustrating the operation door and the intermediate door in an intermediate position of the opening portion.

From the closing position, as the operator grips the handle 23 and slides the operation door 12 to the left side, as illustrated in FIG. 4B, the slide rail 32 is put in a contracted state where the front rail 40 and the intermediate rail 42 slide to the left side and overlap with the rear rail 41. Since the moving side rack 35 does not slide up to the intermediate position, the linkage mechanism 31 does not operate and the intermediate door 11 does not slide. Therefore, the opening portion 10 partially opens only as much as the operation door 12 slides (moving distance A in FIG. 4B).

By sliding the operation door 12 to the right side from the intermediate position in FIG. 4B, the moving side rack 35 slides to the right side via the slide rail 32 and attempts to rotate the upper pinion 37 in the left direction in plan view. However, in the intermediate door 11, since the inside rail 16 is in contact with the left end of the left guide plate 17 and the right guide plate 18 and is restricted from sliding to the right side, the stopper of the slide rail 32 comes off and the intermediate rail 42 and the front rail 40 extend to the right side. Therefore, it becomes possible to slide the operation door 12 alone to the closing position in FIG. 4A.

Meanwhile, by sliding the operation door 12 to the left side from the intermediate position in FIG. 4B, the moving side rack 35 integrally slides to the left side via the slide rail 32. Therefore, in the linkage mechanism 31, the upper pinion 37 rotates in the right direction in plan view, and the lower pinion 38 also rotates in the right direction via the pinion shaft 33. Thus, since the lower pinion 38 rolls over to the left side along the fixed side rack 34, the intermediate door 11 also slides to the left side in association. However, the movement amount of the intermediate door 11 is smaller than the movement amount of the operation door 12. A difference of the movement amount is determined according to the reduction gear ratio between the upper pinion 37 and the lower pinion 38.

Figure 4C:
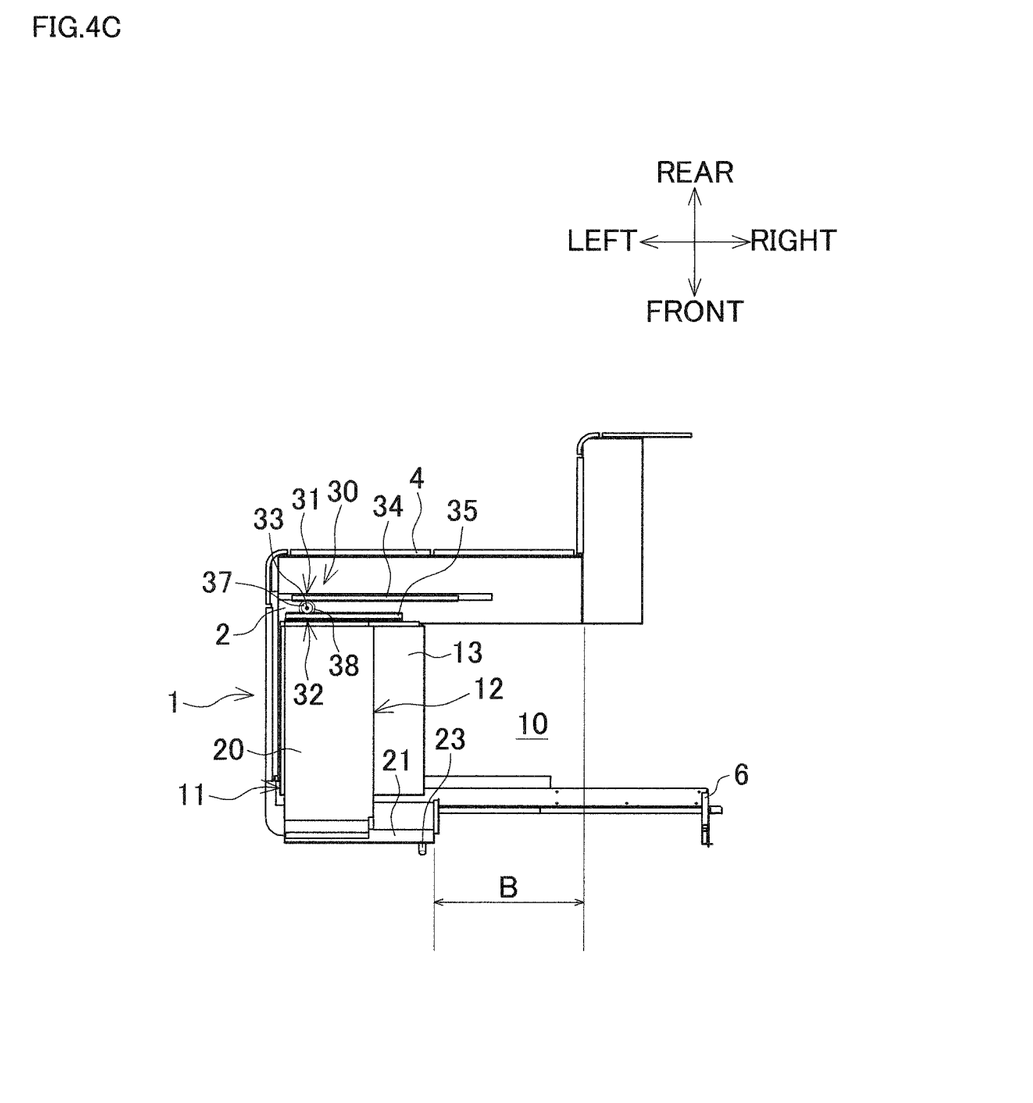
FIG. 4C is an explanatory plan view illustrating the operation door and the intermediate door in a fully open position of the opening portion.

In addition, as illustrated in FIG. 4C, as the intermediate door 11 slides until coming into contact with the stopper (not illustrated) disposed to the cover 1, the operation door 12 also slides by amount of the moving distance B from the intermediate position, and slides until the fully open position where the outside upper plate portion 20 overlaps with the left side of the inside upper plate portion 13 of the intermediate door 11. In the state, the opening portion 10 is fully opened.

In a case where the opening portion 10 is closed from the fully open position, the operation door 12 is slid to the right side in reverse to the above described case. Thus, the slide rail 32 remains in the contracted state, while the moving side rack 35 slides to the right side together with the operation door 12. Therefore, in the linkage mechanism 31, the upper pinion 37 rotates in the left direction in plan view, and the lower pinion 38 also rotates in the left direction via the pinion shaft 33. Thus, since the lower pinion 38 rolls over to the right side along the fixed side rack 34, the intermediate door 11 also slides to the right side in association. At this point as well, the movement amount of the intermediate door 11 is smaller than the movement amount of the operation door 12.

When the operation door 12 reaches the intermediate position (position where the intermediate door 11 closes the left side of the opening portion 10), the inside rail 16 comes into contact with the left end of the left guide plate 17 and the right guide plate 18 and is restricted from sliding. By continuing the slide of the operation door 12 from this point, the stopper of the slide rail 32 comes off, allowing the intermediate rail 42 and the front rail 40 to extend, and the operation door 12 can be slid to the closed position in FIG. 4A.

As described above, the door open and close mechanism 30 includes the operation door 12 operated to open and close, and the intermediate door 11. The linkage mechanism 31 is disposed between the intermediate door 11 and the operation door 12, and the linkage mechanism 31 associates the intermediate door 11 with the opening and closing of the operation door 12. The slide rail 32 (slide mechanism) is disposed between the operation door 12 and the linkage mechanism 31, and the slide rail 32 (slide mechanism) enables the operation door 12 alone to open and close alone by a predetermined moving distance A. Furthermore, when the operation door 12 is operated to open and close within the moving distance A, the operation door 12 alone opens and closes using the slide rail 32, and when the operation door 12 is operated to open and close beyond the moving distance A, the intermediate door 11 opens and closes in association through the linkage mechanism 31.

With the configuration, since a force of a sliding resistance of the slide rail 32 alone is sufficient when partially opening the opening portion 10 by operating the operation door 12, an operator bears no burden. On the other hand, since the intermediate door 11 is associated with the linkage mechanism 31 after the slide rail 32 contracts when fully opening the opening portion 10, even a plurality of doors can be operated simultaneously. Accordingly, it becomes possible to open the operation door 12 alone while enjoying the advantages of the linkage mechanism 31, thus allowing the excellent workability.

Especially, the linkage mechanism 31 uses the rack and pinion mechanism. Therefore, the linkage mechanism 31 can be formed with a small space. Furthermore, the operation door 12 and the intermediate door 11 can slide smoothly. The rack and pinion mechanism is structured including the moving side rack 35 disposed on the operation door 12 side, the fixed side rack 34 disposed on the cover 1 side, the upper pinion 37 (first pinion) disposed on the intermediate door 11 side and meshing with the moving side rack 35, and the lower pinion 38 (second pinion) disposed on the intermediate door 11 side, coaxially with the upper pinion 37, and meshing with the fixed side rack 34, and the slide rail 32 is disposed between the operation door 12 and the moving side rack 35.

Therefore, by changing a reduction gear ratio of both the pinions 37 and 38, a movement amount of the operation door 12 and the intermediate door 11 can be changed easily. Furthermore, by adjusting the length of each rail of the slide rail 32, the moving distance A of the operation door 12 can be set easily.

The following describes a modification example of the disclosure.

In the embodiment described above, the moving side rack is disposed on the upper side and the fixed side rack is disposed on the lower side, but in reverse, the moving side rack may be disposed on the lower side and the fixed side rack may be disposed on the upper side. In this case, diameters (reduction gear ratio) of the pinions also become upside down.

Moreover, the structure of the slide rail is not limited to the embodiment described above. The number, length, and the like of the rail can be changed as necessary. Structures besides the slide rail can also be employed as the slide mechanism.

A plurality of intermediate doors may be employed. In this case, the corresponding pinion shaft is disposed to each intermediate door. In the embodiment described above, the operation door and the intermediate door have an inverse L-shape in a side view, but the configurations of both the doors are not limited to the above. For example, a door having a rectangular shape in a front view is applicable to the disclosure by employing a door open and close mechanism in which the pinion shaft is arranged in a front-rear direction above both the doors.

Furthermore, a shape of the cover, and a position and shape of the opening portion are not limited to the configuration described above.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A door open and close mechanism for opening and closing a plurality of doors in a machine tool including a cover to open and close an opening portion using the plurality of doors, the plurality of doors including an operation door operated to open and close and at least one intermediate door, the door open and close mechanism comprising:
   a linkage mechanism disposed between the operation door and the intermediate door, the linkage mechanism associating the intermediate door with the opening and closing of the operation door; and
   a slide mechanism disposed between the operation door and the linkage mechanism, the slide mechanism enabling the operation door alone to open and close by a predetermined moving distance,
   wherein when the operation door is operated to open and close within the moving distance, wherein the operation door alone opens and closes by the slide mechanism, and when the operation door is operated to open and close beyond the moving distance, the intermediate door opens and closes in association through the linkage mechanism,
   wherein the linkage mechanism uses a rack and pinion mechanism,
   wherein the rack and pinion mechanism includes a moving side rack disposed on a side of the operation door, a fixed side rack disposed on a side of the cover, a first pinion disposed on a side of the intermediate door and meshing with the moving side rack, and a second pinion disposed coaxially with the first pinion and meshing with the fixed side rack, and
   wherein the slide mechanism is disposed between the operation door and the moving side rack.

* * * * *